UNITED STATES PATENT OFFICE.

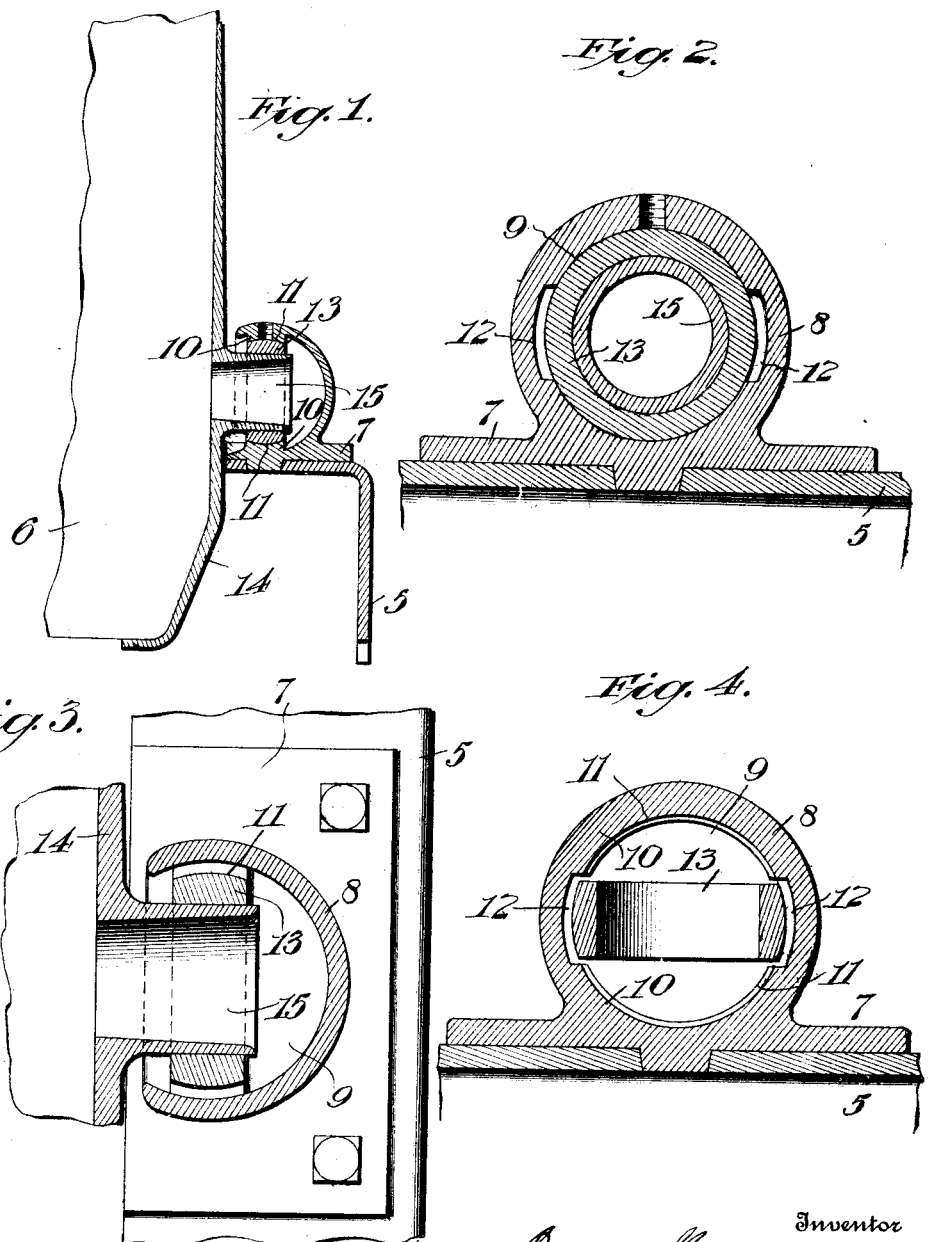

OSCAR STEGEMAN, OF DENVER, COLORADO.

BEARING FOR SUPPORTING RADIATORS IN AUTOMOBILE-FRAMES.

1,062,197.  Specification of Letters Patent.  Patented May 20, 1913.

Application filed August 19, 1909. Serial No. 513,588.

*To all whom it may concern:*

Be it known that I, OSCAR STEGEMAN, a citizen of the United States, and residing in Denver, in the county of Denver and State of Colorado, have invented a new and useful Improvement in Bearings for Supporting Radiators in Automobile-Frames, of which the following is a specification.

The present invention in one aspect may be considered an improvement on the former patent granted to Percy W. Noble on March 24, 1908, No. 883,146.

It is particularly intended as a bearing for supporting radiators in automobile frames, though it may be successfully employed for other purposes.

The primary object of the present invention is to greatly simplify the structure while retaining all its advantageous features.

More particularly the aim has been to provide a bearing support comprising two unitary parts, which can be readily interfitted and detached, and yet when in assembled condition, cannot accidentally become disengaged.

The preferred form of construction is illustrated in the accompanying drawings, wherein:—

Figure 1 is a vertical sectional view through a portion of an automobile frame and radiator, illustrating the latter supported on the former by the improved structures. Fig. 2 is a sectional view at right angles to Fig. 1. Fig. 3 is a horizontal sectional view through the structure. Fig. 4 is a sectional view similar to Fig. 2, but showing the ring in horizontal relation and in a position to be inserted or removed.

Similar reference numerals designate corresponding parts in all the figures of the drawings.

In the embodiment disclosed, the frame of the automobile is designated generally by the reference numeral 5, and a portion of the radiator is illustrated and designated 6. Secured upon the frame bar, is a base 7 having an upstanding integral bearing box 8 formed of a single piece, and having an open inner side. This box is provided with a circular internal chamber 9, the top and bottom walls of which are provided with ribs 10 having internal bearing surfaces 11 that are longitudinally curved on the same radius, and are transversely concaved. The ends of these ribs and surfaces are spaced apart, as shown at 12 to provide clearance spaces.

A bearing member, in the form of a ring 13, is employed having a width less than the distance between the ends of the ribs 10 so that when said ring is in a horizontal position, as illustrated in Fig. 4, it will pass freely into the clearance spaces. The peripheral surface of the ring is curved, and is transversely convexed. Its diameter is such that it will fit between the ribs 10 when in vertical position, the convexity of the surface corresponding to the concave contour of the bearing surfaces 11, as shown in Fig. 1. Secured by any suitable means to the radiator 6 is a saddle 14, and this saddle is provided with an outstanding trunnion 15 that detachably engages in the ring.

With this structure, it will be obvious that when the parts are in assembled position, as shown in Fig. 1, the ring is capable of rotary and gyratory movement because of the coacting convexed and concaved surfaces. The frame and radiator can therefore move with respect to each other in practically any direction, because of the universal joint or bearing between them. At the same time, the ring is held against movement to a horizontal position with respect to the bearing box by the trunnion. If, however, the trunnion is disengaged from the ring, then said ring can be moved to a horizontal position, in which case, it will pass freely through the clearance space. It will thus be obvious that the ring can be introduced and removed without difficulty, but when the parts are assembled, it is securely interlocked with the bearing box and can not become disengaged. Moreover in this structure, there are no threaded or other detachable parts, and not only is the bearing greatly simplified, but the danger of derangement and loss of parts entirely obviated.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a device of the class described, the combination with a bearing box having a clearance space, of a bearing member arranged for gyratory movement in said box and being insertible and removable through said clearance space when in one position, said bearing member being tiltable from such position into interlocking engagement with the bearing in the box, and a supporting element detachably engaging the bearing member and arranged to permit gyratory movement thereof.

2. In a device of the character described, the combination with a bearing box having internal curved bearing surfaces with a clearance space between them, and a bearing member having a circular bearing surface that is capable of gyratory movement on the bearing surface of the box, said member when tilted to one position being capable of passage through the clearance space and detachment from and engagement with the box and when in all other positions being interlocked with said box.

3. In a device of the character described, the combination with a bearing box having internal curved bearing surfaces with a clearance space between them, and a bearing member having a circular bearing surface that is capable of gyratory movement on the bearing surface of the box, said member when tilted to one position being capable of passage through the clearance space and detachment from and engagement with the box, said surfaces of the box and member being one concave and the other convex and when in other than said predetermined position, being interfitted and maintaining the parts against detachment.

4. In a device of the character described, the combination with a bearing box having internal curved bearing surfaces with a clearance space between them, of a bearing ring having a circular bearing surface that is capable of gyratory movement on the bearing surface of the box, said ring having a width that permits it to pass through the clearance space when tilted to one position and being capable of turning so as to interfit with the bearing surface of the box, said ring when the surfaces are so interfitted being maintained against detachment.

5. In a device of the character described, the combination with a bearing box having internal curved bearing surfaces with a clearance space between them, of a bearing ring having a circular bearing surface that is capable of gyratory movement on the bearing surface of the box, said ring having a width that permits it to pass through the clearance space when tilted to one position and being capable of turning so as to interfit with the bearing surface of the box, said ring when the surfaces are so interfitted being maintained against detachment, and a trunnion that engages in the bearing box and in the ring to maintain the surfaces in interfitted relation.

6. In a device of the character set forth, the combination with a base having an upstanding integral bearing box formed of a single piece of material and provided with an open inner side, said bearing box having internal opposite curved surfaces that are transversely concaved and having their ends spaced apart to provide opposite clearance spaces, of a bearing ring having a width less than the clearance spaces insertible and removable therethrough when tilted to one position, and a diameter that will permit it to interfit with the bearing surfaces, said ring having its outer face transversely convexed to correspond to the concaved bearing surfaces, and a supporting box that detachably engages in the ring.

Signed at the city of Denver, and State of Colorado, this 14th day of July, 1909.

OSCAR STEGEMAN. [L. S.]

Witnesses:
E. A. STEGEMAN,
WM. STEGEMAN.